(12) United States Patent
Swartz

(10) Patent No.: US 8,365,982 B2
(45) Date of Patent: Feb. 5, 2013

(54) METHODS AND APPARATUS FOR MANUFACTURING A COMPUTER WITHOUT ASSEMBLY

(76) Inventor: Robert Swartz, Highland Park, IL (US)

( * ) Notice: Subject to any disclaimer, the term of this patent is extended or adjusted under 35 U.S.C. 154(b) by 227 days.

(21) Appl. No.: 12/779,890

(22) Filed: May 13, 2010

(65) Prior Publication Data

US 2011/0278365 A1  Nov. 17, 2011

(51) Int. Cl.
  *G01P 11/00* (2006.01)
(52) U.S. Cl. ................. 235/61 D; 235/1 D
(58) Field of Classification Search .............. 235/61 R, 235/1 D
  See application file for complete search history.

(56) References Cited

U.S. PATENT DOCUMENTS 4,259,568 A * 3/1981 Dynesen ............... 235/1 D

* cited by examiner

*Primary Examiner* — Karl D Frech
(74) *Attorney, Agent, or Firm* — Stephen R. Otis

(57) ABSTRACT

In an illustrative implementation of this invention, a mechanical computer is manufactured without a separate step of assembly. This is achieved by producing parts in a three dimensional pattern (in relation to each other) such that, when this manufacturing is completed, the components are already assembled to form a computer or part of a computer. The second step of assembling the parts into a desired three dimensional pattern is avoided, because the parts, when made, are already arranged in that 3D pattern.

19 Claims, 2 Drawing Sheets

A CAD DESIGN FOR A COMPUTATIONAL DEVICE IS PREPARED. THE CAD DESIGN SPECIFIES, AMONG OTHER THINGS, THE 3-D ARRANGEMENT OF THE DEVICE'S PARTS RELATIVE TO EACH OTHER. — 1

ADDITIVE MANUFACTURING IS USED TO MAKE THE PARTS, ACCORDING TO THE CAD DESIGN. THE PARTS ARE MADE IN THE DESIRED 3-D PATTERN, SO THAT THEY ARE, WHEN MADE, ALREADY ASSEMBLED AS THE COMPUTATIONAL DEVICE. — 2

METHODS AND APPARATUS FOR MANUFACTURING A COMPUTER WITHOUT ASSEMBLY

FIELD OF THE INVENTION

This invention relates generally to computational devices.

BACKGROUND OF THE INVENTION

It is well known that analog computation may be done with mechanical moving parts, such as gears, cams, cables, chains, pulleys, rotating shafts, racks and pinions, mechanical linkages, disks, slides and slots. With these mechanical components, computations such as addition, subtraction, multiplication, integration, coordinate conversion from polar to rectangular, and calculations of functions of multiple variables may be achieved. For example, analog mechanical computers that were used for naval gun fire control in World War II were capable of highly complex computations.

It is also well known that digital logic gates may be constructed from mechanical moving components. For example, AND, OR and NOT gates may be so constructed, allowing Boolean functions of arbitrary complexity to be calculated with mechanical moving parts. Furthermore, both analog and digital computers may be made from mechanical moving components.

A major problem with mechanical computers, however, is that their manufacture has required assembly of the parts of which they are comprised. That is, it has been necessary, after the mechanical parts are made, to put them together to make the computer. If done by hand, this assembly is time-consuming, expensive and requires highly trained technicians. Assembly may be automated, at least to some extent, but such automation becomes increasingly difficult and expensive as the complexity of the mechanical computer increases. Moreover, automated assembly tends to be inflexible and unable to handle changes in design of the computer.

Conventionally, the separate step of assembly is considered indispensable in any manufacturing process, including the manufacture of computers. For example, according to the home page for Assembly Magazine (http://www.assemblymag.com/HTML/69086047124f9010VgnVCM100000f932a8c0), May 7, 2010:

> "Product assembly is arguably the one indispensable function that must occur in every manufacturing industry. Without the ability to assemble their products, manufacturing companies could not manufacture, and would not exist as we know them."

SUMMARY

Why, in the conventional manufacture of mechanical computers, is assembly needed? It is required because, when the mechanical parts are themselves manufactured, they are not at that time already arranged in the three dimensional pattern of components that is accomplished later with assembly.

In an illustrative implementation of this invention, a separate step of assembly is not needed. This is achieved by producing components in a three dimensional pattern (in relation to each other) such that, when the components are produced, they are already assembled to form a computer or part of a computer. The second step of assembling the parts into a desired three dimensional pattern is avoided, because the parts, when made, are already arranged in the desired 3D pattern. Thus, the resulting device could be called "pre-assembled", "self-assembled" and the method of production could be called "assembly-less".

In an illustrative implementation of this invention, a mechanical computer manufactured in this manner is capable of highly complex computations. For example, it can perform complex mathematical calculations and logical functions, and can store information in memory and retrieve it from memory.

According to principles of this invention, a computer made in this manner may be an analog computer or a digital computer.

DETAILED DESCRIPTION

According to principles of this invention, a mechanical computation device may be manufactured without assembly. Put differently, the separate step of assembly is no longer needed. Advantageously, in many cases, this would dramatically reduce the expense and time required for manufacture.

Figure 1:
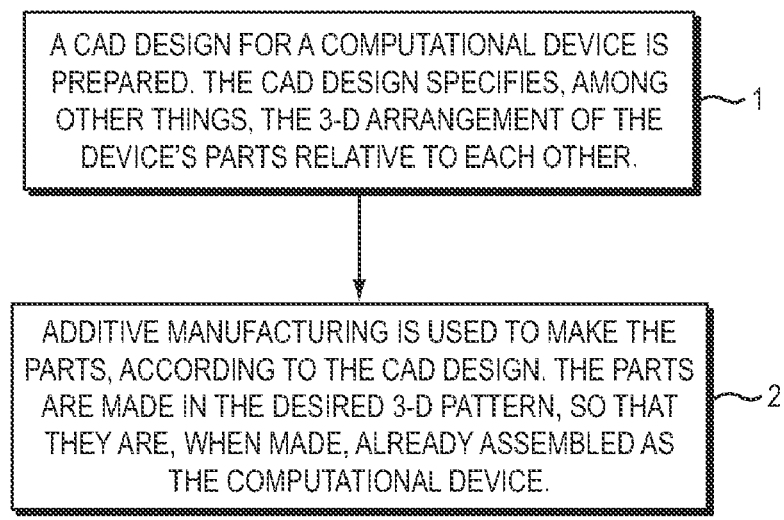
FIG. 1 is a diagram illustrating steps in a process of producing a computational device without assembly, in an illustrative implementation of this invention.

FIG. 1 shows steps of "assembly-less" manufacturing of a computational machine, in an illustrative implementation of this invention. The machine is designed using a CAD (computer-aided design) program 1. The CAD design specifies the shape of each of the components of the machine. It also specifies the three-dimensional arrangement of the components relative to each other, in which the components are to be manufactured. Additive manufacturing is used to make components of the machine, according to the CAD design 2. The components are made in the desired three dimensional pattern, so that they are, when made, already assembled as a computational machine.

Figure 2:
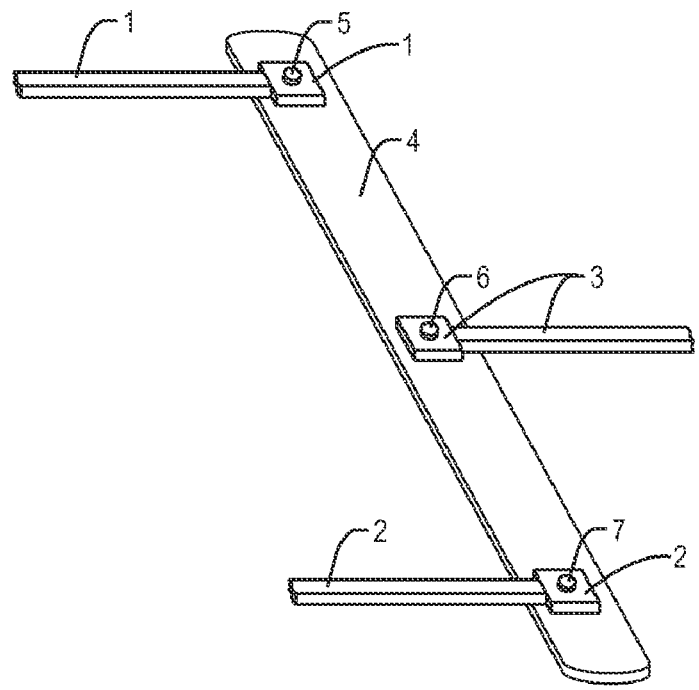
FIG. 2 is a perspective view of a mechanical analog adder, in an illustrative implementation of this invention.

FIG. 2 shows a perspective view of an analog adder that may be manufactured without assembly, in an illustrative implementation of this invention. In this example, the adder is manufactured in the three dimensional arrangement shown in FIG. 2, at the time that the components are formed, using the process shown in FIG. 1. In other words, the adder is made already assembled. In this example, the analog adder is adapted for performing addition as follows: Rods 1, 2 and 3 are each joined to bar 4 by pivot pins 5, 6 and 7, respectively. Rods 1 and 2 act inputs, and rod 3 acts as an output. If rod 1 moves a distance x and rod 2 moves a distance y, then rod 3 moves a distance $z=(x+y)/2$. Addition is thus accomplished, although the ratio of the output distance to the sum of input distances is 1:2. To convert the scale back to 1:1, an analog link multiplier may be used.

Figure 3:
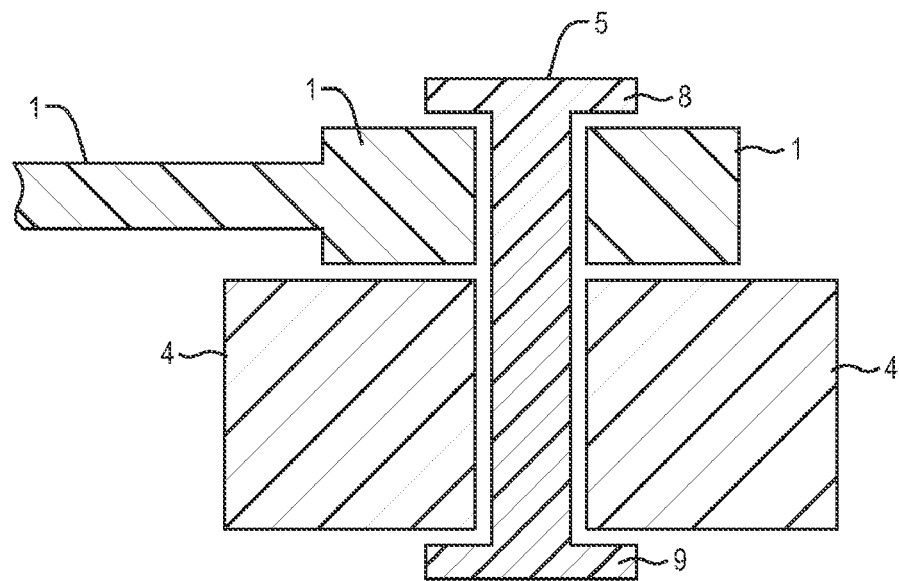
FIG. 3 is a cross-sectional view of a rod, bar and pivot pin in that adder, in an illustrative implementation of this invention.

FIG. 3 shows a cross-section of the joint between rod 1 and bar 4, in the foregoing example. A pivot pin 5 connects rod 1 and bar 4. Flanges 8 and 9 of the pivot pin help hold this pivot pin in place. In this example, rod 1, bar 4 and pivot pin 5 are manufactured in the three dimensional arrangement shown in FIG. 3, at the time that these components are formed. Thus, no further assembly is required.

Figure 4:
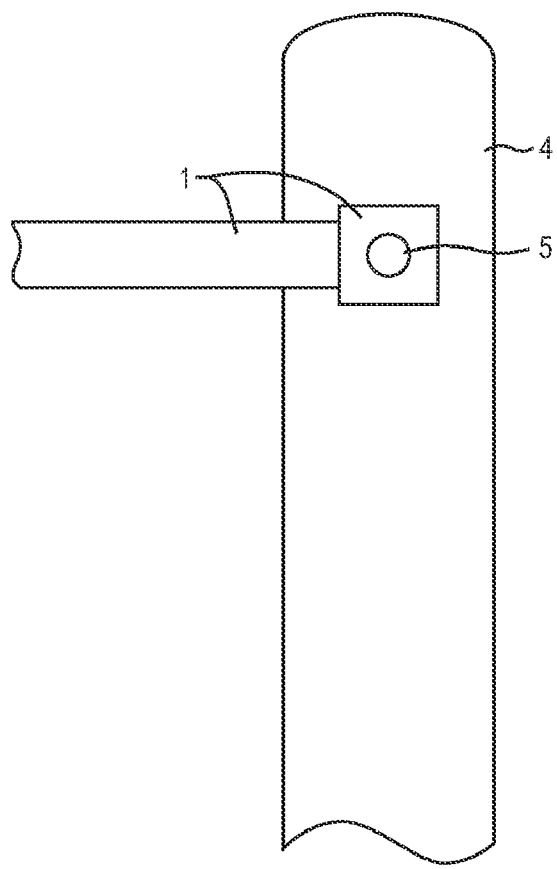
FIG. 4 is a top view of a rod, bar and pivot pin, in an illustrative implementation of this invention.

FIG. 4 is a top view of the joint shown in FIG. 3.

In this illustrative example, a step in a conventional manufacturing process is omitted. Specifically, the separate step of assembly (in addition to the manufacture of the components themselves) is not needed. However, the result of the omitted step—the positioning of the components in a desired "assembled" 3D arrangement—is still achieved.

For example, suppose you want to manufacture parts according to principles of this invention, so that when the parts are made, they are already in the "assembled" 3D pattern of the analog adder shown in FIG. 2. Here is an illustration of how this may be done: Using Rhino® software (available from Robert McNeel Associates, Seattle Wash.), CAD designs for a pivot pin, bar and rod, respectively, are created. The pivot pin and rod designs are then each copied three times, resulting in CAD designs for seven components, comprising three pivot pins, three rods and a bar. These seven components are then virtually arranged, in the CAD design, into the desired "assembled" 3D pattern. Rhino® software is used to export the CAD design as an STL file. The STL file is sent to a Fortus® 900mc printer (available from Stratasys, Inc., Eden Prairie, Minn.). Using this printer, the components are manufactured by an additive manufacturing technique called fused deposition modeling, in which layers of thermoplastic material are deposited by an extrusion nozzle and harden after extrusion. Because the components are manufactured in the three-dimensional pattern specified in the CAD design, the components are, when made, already assembled in the desired 3D pattern of the adder shown in FIG. 2.

The above example involved a Rhino® CAD program and fused deposition modeling (FDM). But this invention is not limited to these. Indeed, this invention may be implemented with any other method of manufacturing that allow components to be manufactured in a 3D pattern (relative to each other) so that, when they are made, no further assembly is needed. The manufacturing method used may or may not be computer-aided.

For example, other additive manufacturing techniques that may be used to implement this invention include: selective laser sintering, direct metal laser sintering, electron beam melting, electron beam freeform fabrication, laminated object manufacturing, aerosol jetting, stereolithography, solid ground curing, and three-dimensional printing (such as with thermal phase change inkjet-style printers or photopolymer phase change inkjet-style printers), 3D microfabrication, additive layer manufacturing, layer manufacturing, and freeform fabrication.

Alternately, a combination of additive and subtractive manufacturing methods may be used to manufacture the parts. These subtractive methods may include any method of removing materials, such as dissolving, melting, milling, sanding, polishing or mechanically breaking materials, or simply moving material (such as loose, unfused powder) away. For example, manufacturing may initially be additive (with material being deposited to make both the parts and support materials), and then subtractive (e.g. support materials being removed by dissolving them). Or alternately, purely subtractive manufacturing may be used.

If the manufacturing is computer-aided, other CAD or computer design software besides Rhino® may be used to implement this invention. For example, this invention may be implemented using other 3D parametric solid modeling programs such as CATIA® and Solidworks® programs.

In different embodiments of this invention, the type of material (or materials) used to manufacture parts, the type of the parts, and the size and functionality of the parts may vary. Furthermore, in different embodiments of this invention, the movement of parts in a computational device may be of any type, including among other things translation, rotation, deformation, oscillation, or vibration.

According to principles of this invention, special care may be taken to ensure that the parts, when manufactured in a desired 3D pattern, interoperate properly and comply with limitations of the manufacturing process. Consider the case of fused deposition modeling (FDM), in which support material is removed from the parts after they are formed. In that case, the CAD design may provide (1) for two moving parts to be at least slightly separated when they are manufactured (so they do not fuse or stick together), (2) for a hole or holes in a hollow object, so that support material may be removed from the hollow object, and (3) for the parts to fit in the build area of the FDM machine when built. Thus, for example, if the computational device includes two gears that mesh with each other, the CAD design may provide for the teeth of the gears to have sufficient clearance between them so that they do not fuse and the support material can be removed. Or, for example, if the CAD program requires closed surfaces, then care must be taken that all surfaces be closed, in order for the parts to be manufactured properly.

This invention is not limited to making a simple analog computational device, such as the adder shown in FIG. 2.

Instead, this invention may be implemented to make powerful mechanical computers.

To fully appreciate this, it is helpful to briefly review some mechanical computers, their capabilities, and how (like any computer) they may perform complex computational functions using combinations of simple parts.

It is well known that mechanical computers are capable of performing highly complex computations. Also, a mechanical computer may store information in memory, and may read to and write from that memory. Furthermore, a mechanical computer may be designed to perform analog or digital computations.

First, consider analog examples, such as a slide rule, differential analyzer, naval fire control computer, Curta® calculator, or comptometer. A slide rule is a mechanical analog computer. Some slide rules are capable of performing addition, subtraction, multiplication, division and calculation of exponential, logarithmic and trigonometric functions. A differential analyzer is also a mechanical analog computer. It solves differential equations by integration, using wheel and disc integrators connected by shafts. Naval fire control computers used in World II for surface and anti-aircraft gun fire control are yet another example of mechanical analog computers. The design and operation of such computers is described in detail in U.S. Navy Department, Bureau of Ordinance, Ordinance Pamphlet 1140, Basic Fire Control Mechanisms, 1944, available at http://hnsa.org/doc/op1140/index.htm. Among other things, such computers are capable of integration, differentiation, addition, subtraction, and calculations of functions of two variables. A Curta® calculator is a small, hand-held mechanical calculator. This device performed addition, subtraction, multiplication, division, square roots and other functions, and was powered by a small hand crank. A comptometer is a keyed, mechanical calculator for adding, subtracting, multiplying and dividing.

It has been demonstrated that a rational function comprised of a ratio of polynomial functions, in the form:

$$Y(p) = \frac{A_n p^n + A_{n-1} p^{n-1} + \ldots + A_0}{p^n B_{n-1} p^{n-1} + \ldots + B_0}$$

can be computed with a mechanical analog computer by using, in almost all cases, n integrators, 2n adders, 2n junctions, and 2n+1 separate gears (The Theory and Design of Linear Differential Equation Machines, Claude Elwood Shannon Collected Papers, edited by N. J. A. Stone, Aaron D. Wyner, pp. 514-559, IEEE Press, Piscataway, N.J., 1993). Likewise, gears may be used to calculate a complex ratio. (Id.)

Second, consider digital examples. The Z1, invented by Konrad Zuse in the 1930's, is a mechanical digital computer. It is freely programmable, had a 64 word memory comprised of two floating-point 22 bit registers, and performs addition, subtraction, multiplication and division of binary numbers. It handles decimal floating point inputs and produced decimal floating point outputs, and can convert between decimal and binary. The Z1 includes a control unit, arithmetic unit, input and output devices and punched tape reader. Information can be read and written from the memory registers.

It is also well known that a digital mechanical computer may perform calculations with complex numbers. For example, complex multiplication may be done with about six simple arithmetic operations and complex division with about ten simple arithmetic operations, and each requires temporary storage of a few intermediate results.

Furthermore, it is well known that the fundamental logic gates AND, OR and NOT may be implemented with mechanically moving parts. For example, the Z1 employed AND, OR and NOT gates made of moving metal parts. Fundamental logic gates may be embodied in many other mechanical ways, including with rods, and push-pull arrangements. For example, using mechanical parts, an XOR gate may be constructed using fundamental gates, and a digital full adder may be constructed using XOR, AND and OR gates. Also, for example, using logic gates made with mechanical parts, chains comprising an arbitrary number of logical operations may be created.

More generally, it is well known that, by using fundamental logic gates, Boolean logic functions of arbitrary complexity may be created.

This gives mechanical computers enormous capabilities. For example, with Boolean logic functions, a mechanical computer may perform addition, subtraction, multiplication, operations on matrices and other mathematical functions of arbitrary complexity. Or, for example, a mechanical computer may use these Boolean logic functions to implement control flow such as unconditional branches or jumps, conditional branches, calling a subroutine, co-routine or continuation, or stopping a program. Or, for example, a mechanical computer may employ these Boolean logic functions to write to, read from and address memory.

According to principles of this invention, a computer can be made by producing parts in a 3D pattern (relative to each other) such that these parts are already assembled when made. This principle applies regardless of the computer is a simple device, or a complex device comprising many simple building blocks.

As the above discussion demonstrates, simple mechanical parts can be combined in such a way as to allow complex computations. It is well-known in the art how to design a complex mechanical computer out of many simple parts. This invention teaches, among other things, how to produce a computer that is so designed without assembly (by arranging parts so that they are, when made, already in a desired 3D pattern).

This invention can be implemented to make small or large numbers of mechanical logic gates or other simple mechanical parts, joined together in arbitrary 3D arrangements. Thus, it can be implemented to make a mechanical computer of arbitrary complexity. Such computers may be either analog or digital, or both.

For example, this invention may be implemented to make mechanical moving parts, such as gears, cams, chains, cables, pulleys, rotating shafts, racks and pinions, mechanical linkages, disks, slides, slots, and logic gates. Mechanical computations may be effected using these mechanical moving elements.

It must be stressed that designs (3D arrangements of parts) for complex mechanical computers are well known in the art. This invention teaches, among other things, how to produce parts in such a design (3D pattern) without assembly.

For example, this invention may be implemented to produce parts in 3D patterns so as to form computers capable of, among other things: (1) performing mathematical computations (such as addition, subtraction, multiplication, integration, conversion of coordinates, linear algebra, complex numbers, polynomials, exponentiation, functions of one or more variables, and rational, exponential, logarithmic, trigonometric and other transcendental functions), (2) performing chains of logical operations, (3) processing data representative of text characters, (4) performing control flow, including unconditional branches or jumps, conditional branches, calling a subroutine, co-routine or continuation, or stopping a program, (5) writing to, reading and addressing memory, or (6) inputting or outputting data represented by floating-point representation. Also, for example, this invention may be implemented to produce many simple parts in 3D patterns so as to form computers capable of, among other things: (1) performing computations involving a polynomial function of a degree greater than two, a matrix with at least two rows or at least two columns, a complex number with an imaginary part greater than zero, or an exponential function involving an exponent greater than two, or (2) performing a chain of at least five logical operations, such as NOT, AND, OR or XOR operations.

According to principles of this invention, a computational device comprising many components may be made without assembly. However, that device may later be put together or assembled with other physical objects (which may have been assembled in a conventional manner). For example, the adder shown in FIG. 2 may be constructed without assembly, but then assembled into a larger mechanical computer of which the adder is only a small portion. Other portions of the mechanical computer may have been assembled in a conventional manner.

In some implementations of this invention: (1) components that comprise only a portion of a computational machine are made in a desired 3D pattern without assembly, and (2), other physical objects are added by assembly or otherwise to complete the computational machine. For example, a mechanical computer may be made without assembly according to principles of this invention. Then, later, an electric motor may be added to provide power for that computer.

This invention may be implemented to make computational devices that are powered in different ways, such as by spring, crank, winding mechanism, weight or other source of non-electrical energy. Alternately, such computational devices may be powered by electrical energy, such as with batteries and an electric motor. In some implementations of this invention, a portion of a computer comprises many components and is made without assembly, and a power source (such as a battery or electric motor) is added to that portion by assembly to help complete the computer. Or, alternately, electrical circuitry is added by assembly to a mechanical portion (made without assembly) to help make an electro-mechanical computer. For example, with such an approach, one can make an electro-mechanical computer with mechanical rotors and keys that form varying electrical circuits (along the lines of the World War II Enigma encryption and decryption computer) or an electro-mechanical computer with relay switches (along the lines of the World War II Complex Calculator for complex number calculations).

For the sake of clarity, here are a few definitions:

A "computation" is a logical operation, calculation, step in reading or writing memory, step in control flow, step in input or output, or other processing step performed by a computer or other computational device.

A "mechanical computer" or a o "mechanical computational device" means a computational device that uses at least one moving part to effect at least one computation, other than merely input of data. An electro-mechanical computer is an example of a mechanical computer.

An electric charge carrier (such as an electron or a positively charged hole in a p-type semiconductor) is not by itself a "component".

"Digital" refers to computation involving at least one discrete, noncontinuous function. One example is computation wherein one range of voltages represents the binary number 1 (or logic 1) and another range of voltages represents the binary number 0 (or logic 0). "Digital" is not limited to binary values, but may involve other types of values, including numbers represented by a positional numeral system with a base other than two. Furthermore, "digital" is not limited to voltages, but may involve values represented by other physical phenomena.

If manufacturing of a component includes removal of material from said component, then such manufacturing is "completed" at the later of when the last material is added to said component or when the last material is removed from said component. Thus, for example, if additive manufacturing involves support materials that are removed from a manufactured part, then said manufacturing would be "completed" no earlier than when the support material is removed from said part.

"3D manufacturing" means a manufacturing process that causes materials to be arranged in a 3-dimensional pattern.

A "Type A computation" means a computation that involves multiplication, division or a transcendental function.

A "Type B computation" means a computation that involves integration or differentiation.

A "Type C computation" means a computation that involves a chain comprising at least five logical operations. For example, such logical operations may include, among other things, the NOT, AND, OR or XOR operations.

A "Type D computation" means a computation that involves the processing of data representative of text characters.

A "Type E computation" means a computation that either: (1) involves a polynomial function of a degree greater than two, a matrix with at least two rows or at least two columns, a complex number with an imaginary part greater than zero, or an exponential function involving an exponent greater than two, or (2) outputs data represented by floating-point representation.

A "Non-Trivial Computation" means a computation that comprises a Type A computation, Type B computation or Type C computation.

A "Complex Computation" means a computation that comprises a Type E computation.

The "storage" of information refers to storage of information in such a manner that said information may be repeatedly accessed at different times.

This invention may be implemented in many different ways. Some examples follow:

This invention may be implemented as a method of producing a computational machine, wherein (a) a plurality of physical components are produced by additive manufacturing in a three dimensional pattern such that, at the time said manufacturing is completed, said components are already assembled in said pattern as all or part of said machine, and (b) said machine is adapted for performing at least one Non-Trivial Computation that is effected, at least in part, by movement of at least one of said components. Furthermore: (1) at least one of said computations may be an analog computation that is effected, at least in part, by movement of at least one of said components, (2) said computational machine may be a mechanical computer, (3) said machine may be further adapted for performing at least one Complex Computation that is effected, at least in part, by movement of at least one of said components, (4) said machine may be further adapted for storing information, in such a way that said storage is effected, at least in part, by movement of at least one of said components, and (5) said components may comprise only a portion of said computational machine, and said method may comprise at least one additional step of assembling said portion with at least one other physical object to make said computational machine.

This invention may be implemented as a process of producing a plurality of physical components, wherein: (a) said components are produced by additive manufacturing in a three dimensional pattern such that, at the time said manufacturing is completed, said components are already assembled in said pattern as an apparatus, and (b) said apparatus is adapted for use in a mechanical computational device for performing at least one computation and storing and retrieving information, in such a way that: (i) said computation requires movement of at least one of said components, and (ii) said storage or said retrieval of information requires movement of at least one of said components. Furthermore: (1) said apparatus may be further adapted for performing at least one Non-Trivial Computation in such a way that said Non-Trivial Computation requires movement of at least one of said components; (2) said apparatus may be further adapted for performing at least one Complex Computation in such a way that said Complex Computation requires movement of at least one of said components, (3) said apparatus may comprise only a portion of said computational device, and said apparatus may be adapted to be joined, by assembly or otherwise, with at least one other one physical object to make said computational device, and (4) said computation may involve processing of data represented by physical states, at least one of which comprises a state of one or more electromagnetic waves or of the interaction of said waves.

This invention may be implemented as a method of producing a computer, wherein: (a) a plurality of separate physical components are created in at least one three-dimensional pattern such that, when created, said components are already assembled as one or more devices, (b) said one or more devices are adapted for use in said computer, and (c) said computer is adapted for performing at least one Non-Trivial Computation and storing and retrieving information, in such a manner that: (i) said computation is effected, at least in part, by movement of at least one of said components, and (ii) said storage and retrieval of information is effected, at least in part, by movement of at least one of said components. Furthermore: (1) said computer may be powered by a spring, crank, winding mechanism, weight or other source of non-electrical energy, (2) said computer may be powered at least in part by electricity, (3) said computer may be an electro-mechanical computer, (4) said computer may be further adapted for performing at least one Complex Computation that is effected, at least in part, by movement of at least one of said components, and (5) said components may comprise only a portion of said computer, and said method may comprise at least one additional step of joining said portion with at least one other physical object to make said computer.

This invention may be embodied as an apparatus comprising a plurality of physical components arranged in a three dimensional pattern, wherein: (a) said components are produced in a three dimensional pattern such that, at the time said manufacturing is completed, said components are already assembled in said pattern as a device, (b) said device is adapted for use in a computer for performing at least one Non-Trivial Computation in such a manner that: (i) said computation is effected, at least in part, by movement of at least one of said components, and (ii) said storage and retrieval of information is effected, at least in part, by movement of at least one of said components. Furthermore, said apparatus may be adapted for performing at least one Complex Computation that is effected, at least in part, by movement of at least one of said components.

CONCLUSION

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A method of producing a computational machine, wherein:
   a plurality of separate physical components are created by additive layer fabrication such that, when created, the components are already assembled as said machine; and
   said machine is adapted for performing a Non-Trivial Computation by mechanical movement of at least one of said components, which mechanical movement itself transforms an input of the Non-Trivial Computation into an output of the Non-Trivial Computation.

2. The method of claim 1, wherein the Non-Trivial Computation is an analog computation.

3. The method of claim 1, wherein said computational machine is a mechanical computer.

4. The method of claim 1, wherein said machine is further adapted for performing a Complex Computation by mechanical movement of at least one of said components, which mechanical movement itself transforms an input of the Complex Computation into an output of the Complex Computation.

5. The method of claim 4, wherein said machine is further adapted for storing information, in such a way that the storing is effected, at least in part, by movement of at least one of said components.

6. The method of claim 1, wherein said components comprise only a portion of said computational machine, and wherein said method comprises at least one additional step of assembling said portion with at least one other physical object to make said computational machine.

7. A process of producing a plurality of separate physical components, wherein:
   the components are created by additive layer fabrication such that, when created, the components are already assembled as an apparatus;
   said apparatus is adapted for use in a mechanical computational device for performing a computation and storing and retrieving information;
   said computation is performed by mechanical movement of at least one of said components, which mechanical movement itself transforms an input of the computation into an output of the computation; and
   said storing and retrieving of information are each, respectively, effected by mechanical movement of at least one of said components.

8. The process of claim 7, wherein said apparatus is further adapted for performing a Non-Trivial Computation by mechanical movement of at least one of said components, which mechanical movement itself transforms an input of the Non-Trivial Computation into an output of the Non-Trivial Computation.

9. The process of claim 7, wherein said apparatus is further adapted for performing a Complex Computation by mechanical movement of at least one of said components, which mechanical movement itself transforms an input of the Complex Computation into an output of the Complex Computation.

10. The process of claim 7, wherein:
    said apparatus comprises only a portion of said computational device, and
    said apparatus is adapted to be joined, by assembly or otherwise, with at least one other one physical object to make said computational device.

11. A method of producing a computer, wherein:
    a plurality of separate physical components are created by additive layer fabrication such that, when created, the components are already assembled as at least one device;
    the at least one device is adapted for use in said computer; and
    the at least one device is adapted for performing a Non-Trivial Computation and storing and retrieving information, in such a manner that the Non-Trivial Computation is performed by mechanical movement of at least one of said components, which mechanical movement itself transforms an input of the Non-Trivial Computation into an output of the Non-Trivial Computation, and
    the storing and retrieving are each, respectively, effected by mechanical movement of at least one of said components.

12. The method of claim 11, wherein said computer is powered by a spring, crank, winding mechanism, weight or other source of non-electrical energy.

13. The method of claim 11, wherein said computer is powered at least in part by electricity.

14. The method of claim 11, wherein said computer is an electro-mechanical computer.

15. The method of claim 11, wherein said computer is further adapted for performing a Complex Computation by mechanical movement of at least one of said components, which mechanical movement transforms an input of the Complex Computation into an output of the Complex Computation.

16. The method of claim 11, wherein said components comprise only a portion of said computer, and wherein said method comprises at least one additional step of joining said portion with at least one other physical object to make said computer.

17. The method of claim 16, wherein said additional step involves assembly.

18. Apparatus comprising a plurality of separate physical components arranged in a 3D pattern, wherein:

the 3D pattern was produced by a process of additive layer fabrication, in which process the components were, when created, already in the 3D pattern, the 3D pattern cannot be achieved by first creating parts in a different pattern and then assembling the parts; and the apparatus is adapted for performing at least one Non-Trivial Computation by mechanical movement of at least one of said components, which mechanical movement itself transforms an input of the Non-Trivial Computation into an output of the Non-Trivial Computation.

19. The apparatus of claim 18, wherein said apparatus is adapted for performing a Complex Computation by mechanical movement of at least one of said components, which mechanical movement transforms an input of the Complex Computation into an output of the Complex Computation.

* * * * *